United States Patent [19]

Sugimoto et al.

[11] Patent Number: 4,831,906
[45] Date of Patent: May 23, 1989

[54] NUMERICAL CONTROL MACHINE

[75] Inventors: Kenji Sugimoto, Tokorozawa; Youji Takeuchi, Tanashi; Shuichiro Yamashita, Sayama, all of Japan

[73] Assignee: Citizen Watch Co., Ltd., Japan

[21] Appl. No.: 934,903

[22] Filed: Nov. 25, 1986

[30] Foreign Application Priority Data

Nov. 26, 1985 [JP] Japan ............................. 60-265925
Sep. 18, 1986 [JP] Japan ............................. 61-220771

[51] Int. Cl.⁴ ............................................. B23B 3/00
[52] U.S. Cl. .................................... 82/118; 82/117; 82/137; 82/138
[58] Field of Search ................ 82/2 R, 2 B, 24 R, 25

[56] References Cited

U.S. PATENT DOCUMENTS

| 3,851,550 | 12/1974 | Schalles | ............................. | 82/2 B |
| 3,978,745 | 9/1976 | Okamoto . | | |
| 4,016,784 | 4/1977 | Brown . | | |
| 4,413,539 | 11/1983 | Ishizuka et al. . | | |

FOREIGN PATENT DOCUMENTS

| 1131967 | 5/1962 | Fed. Rep. of Germany . |
| 56-69003 | 6/1981 | Japan . |
| 59-201701 | 11/1984 | Japan . |
| 60-52202 | 3/1985 | Japan . |
| 60-52203 | 3/1985 | Japan . |
| 60-52204 | 3/1985 | Japan . |
| 60-71103 | 4/1985 | Japan . |
| 1309561 | 3/1973 | United Kingdom . |
| 2117927 | 10/1983 | United Kingdom . |

*Primary Examiner*—Frederick R. Schmidt
*Assistant Examiner*—Robert Showalter
*Attorney, Agent, or Firm*—Finnegan, Henderson, Farabow, Garrett & Dunner

[57] ABSTRACT

A numerical control machine comprises a headstock rotatably supporting a spindle for a workpiece and a tool rest assembly in front of the headstock. The tool rest assembly includes a first pair of tool rests which are disposed on both sides of the longitudinal axis of the headstock spindle and are simultaneously movable in a first direction perpendicular to the spindle axis, and a second tool rest which is movable in both second and third directions perpendicular to the spindle axis. Either the headstock or the tool rest assembly is movable in a fourth direction along the spindle axis. The movement of the first pair of tool rests in the first direction, the movement of the second tool rest in the second and third directions, and the movement of either the headstock or the tool rest assembly in the fourth direction are carried out under the control of a numerical control unit.

7 Claims, 13 Drawing Sheets

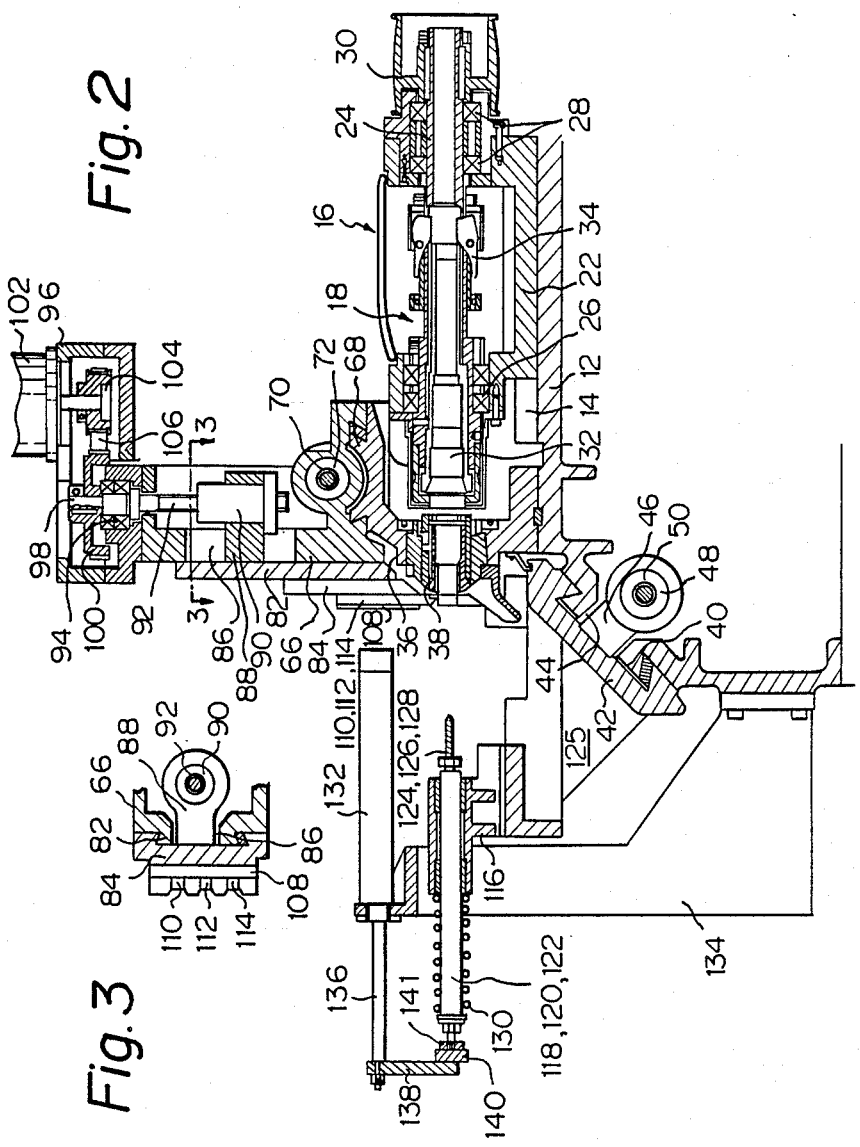

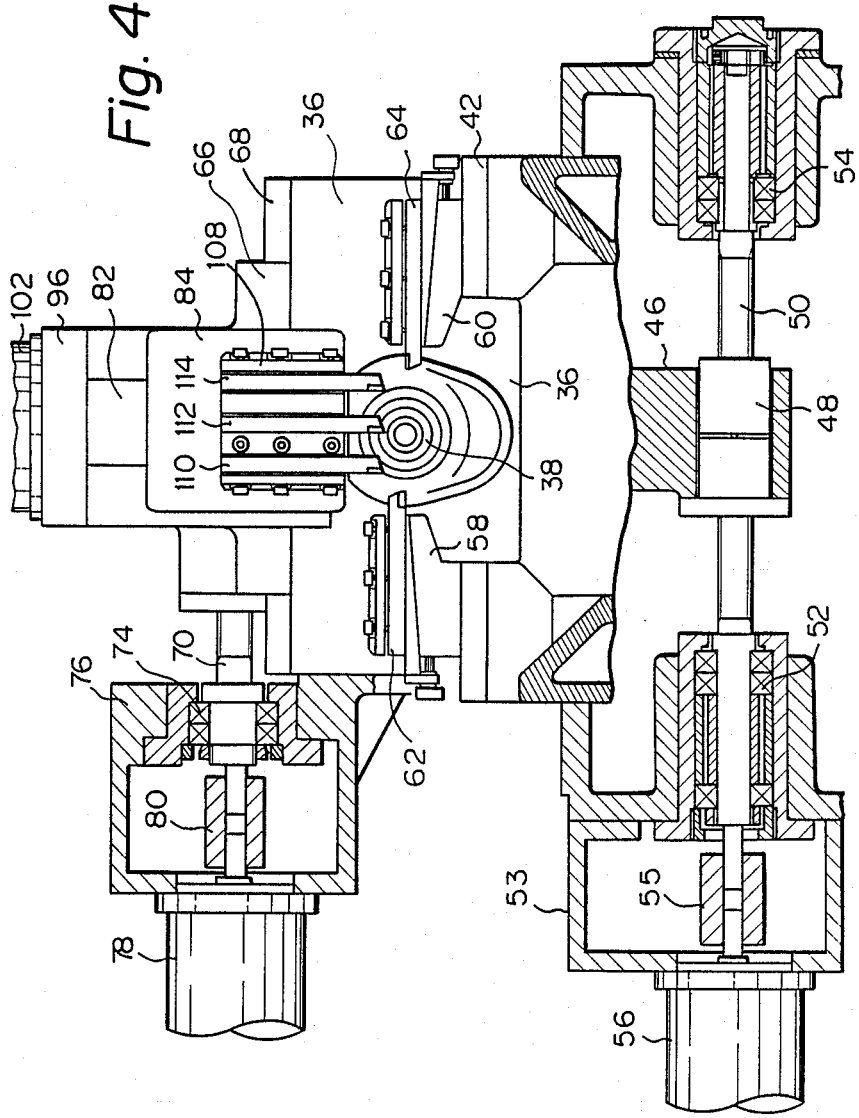

NUMERICAL CONTROL MACHINE

BACKGROUND OF THE INVENTION (1) Field of the Invention

The present invention relates to a numerical control machine (NC machine), and more particularly, to a numerically controlled lathe having a plurality of tool rests or tool posts.

(2) Description of the Related Art

Japanese Unexamined Patent Publication No. 56-69003 filed by this assignee discloses a numerically controlled lathe (NC lathe) which includes a saddle slidably disposed in parallel to the longitudinal axis of the spindle of the headstock and having a lateral guide path perpendicularly across the longitudinal axis of the headstock spindle, and a lateral mount slidably mounted on the lateral guide path of the saddle and having two turret heads disposed on both sides of the spindle axis. In this NC lathe, while a working operation is carried out by using one of the tools held by one of the two turret heads, it is possible to index a selected one of the tools held by the other turret head, whereby the indexing time as required in a conventional NC lathe can be virtually eliminated so that an idling time of the NC machine can be shortened.

However, with the arrangement as mentioned above, it is impossible to immediately start a successive working operation by use of the indexed tool just after the preceding working operation is finished, because an access time is needed for moving the indexed tool to an initial working position. Therefore, in this connection, there still remains room for improvement of the prior NC lathe, to enhance the productivity thereof.

In addition, the construction of the prior NC lathe does not make it possible to carry out a working operation by simultaneously using two or more tools for the purpose of increasing the productivity and/or workability thereof.

On the other hand, a Swiss-type screw machine, which is very well known in this field, includes a plurality of tools which are perpendicularly and radially disposed around the longitudinal axis of the headstock spindle so that the respective tools are individually accessible to a workpiece along their axes, whereby not only can a selected one of the tools be on standby, so that a successive working operation can start immediately a preceding working operation is finished, but also a working operation can be achieved by a simultaneous use of two or more tools. However, it is not expedient to incorporate a numerical control unit into the Swiss-type screw machine because the numerical control unit per se, as well as a program to be used therein, are very complicated, as many tools must be individually controlled thereby, and because the controlling must be so performed that the tools do not interfere with each other. Although the Swiss-type screw machine having many control axes on the tools may be numerically controlled, such a numerical control machine would become bulky and be very expensive.

SUMMARY OF THE INVENTION

Accordingly, it is an object of the present invention to provide a numerical control machine wherein the control axis on the tools can be reduced without degrading the productivity and workability thereof, and thus the machine can be produced at a low cost.

It is also an object of the present invention to provide a numerical control machine of the above-mentioned type wherein a working operation can be carried out in the bi-axis interpolation mode so that the workability thereof can be substantially increased.

It is a further object of the present invention to provide a numerical control machine of the above-mentioned type wherein a working operation can be carried out in a simultaneous tri-axis interpolation mode in which both the bi-axis interpolation motions are simultaneously achieved in axes of two different directions through the intermediary of a common directional axis, whereby the productivity and the workability can be further increased.

It is still further object of the present invention to provide a numerical machine of the above-mentioned type wherein a selected one of the tools can be on standby so that a successive working operation can start immediately after a preceding working operation is finished, whereby idling time of the machine can be minimized.

It is still further object of the present invention to provide a numerical control machine of the above-mentioned type wherein a selected one of the tools can be quickly moved to a predetermined position such as an initial working position by utilizing a function corresponding to the bi-axis interpolation function, whereby idling time of the machine can be further minimized.

In accordance with the present invention, there is provided a numerical control machine comprising: a headstock rotatably supporting a spindle for a workpiece; a first tool rest means movable in a first direction which is perpendicular to the longitudinal axis of the spindle, the first tool rest means including two tool rests which each hold at least one tool and which are disposed on both side of the longitudinal axis of the spindle opposing each other so that a selected one of the tool rests is made accessible to the workpiece by moving the first tool rest means in the first direction; a second tool rest means being movable in both second and third directions which are perpendicular to the longitudinal axis of the spindle, the second tool rest means including a tool rest which holds at least two tools, and being so arranged that a selected one of the tools is made accessible to the workpiece by moving the second tool rest means in both the second and third directions; either the headstock or both the first and second tool rest means is movable in a fourth direction along the longitudinal axis of the spindle; and a numerical control unit for controlling the movement of the first tool rest means in the first direction, the movement of the second tool rest means in both the second and third directions, and the movement of either the headstock or both the first and second tool rest means in the fourth direction.

In accordance with an aspect of the present invention, the first tool rest means includes a first carriage which is movable in the first direction and by which the two tool rests of the first tool rest means are supported. The second tool rest means includes a second carriage which is movable in the second direction, and a third carriage which is supported by the second carriage movable in such a manner that the third carriage is movable in the third direction with respect to the second carriage. The tool rest of the second tool rest means is supported by the third carriage so that it is movable in both the second and third directions.

Where the headstock is movable in the fourth direction and both the first and second tool rest means are immovable in the same direction, there is preferably provided a bed means including a first guide path which extends in the fourth direction and on which said headstock is slidably mounted, a second guide path which is disposed in front of the headstock to extend in the first direction and on which the first carriage is slidably mounted, and a third guide path which is disposed between the headstock and said first carriage to extend in the second direction and on which the second carriage is slidably mounted, the second carriage having a guide path which extends in the third direction and on which said third carriage is slidably mounted. More preferably, the bed means includes a bed on which the first and second guide pathes are provided and a base member which is fixedly or integrally mounted on said bed between the headstock and the first carriage and on which the third guide path is provided The base member may have a guide bush for the workpiece, an axis of the guide bush being in accordance with the longitudinal axis of the spindle On the other hand, where both the first and second tool rest are movable in the fourth direction and the headstock is immovable in the same direction, there are preferably provided a bed means on which the headstock is fixedly mounted and a base mount which is disposed in front of the bed means to be movable in the fourth direction. The base mount includes a guide path which extends in the first direction and on which the first carriage is slidably mounted, and a base member which is fixedly mounted on the base mount and which may have a guide bush for the workpiece, an axis of the guide bush being in accordance with the longitudinal axis of the spindle. The base member has a guide path which extends in the second direction and on which the second carriage supporting the third carriage is slidably mounted.

There are preferably provided four drive motors, such as a stepping motor and an AC or DC servo motor, which are individually driven under a control of the numerical control unit so as to move the first carriage in the first direction, the second carriage in the second direction, the third carriage in the third direction, and either the headstock or the base mount in the fourth direction, respectively. Preferably, the numerical control unit has a bi-axis interpolation function for carrying out a working operation in the bi-axis interpolation mode in both the first and fourth directions and/or in both the third and fourth directions, and/or a simultaneous tri-axis interpolation function for simultaneously carrying out both a working operation in the first and fourth directions and a working operation in the third and fourth directions in the bi-axis interpolation mode through the intermediary of the axis of the fourth direction.

There may be provided three drive motors, such as a stepping motor and an AC or DC servo motor, which are driven under a control of the numerical control unit; two of which are used to move the third carriage in the third direction and the base mount in the fourth direction, respectively. The remaining drive motor is used to move both the first and second carriages in the first and second directions, respectively. Preferably, the numerical control unit has a bi-axis interpolation function for carrying out a working operation in the bi-axis interpolation mode in both the first and fourth directions and/or in the third and fourth directions.

In accordance with another aspect of the present invention, the first tool rest means includes a first carriage which is movable in the first direction and by which the two tool rests of the first tool rest means are supported. The second tool rest means includes a second carriage which is supported by the first carriage of the first tool rest means in such a manner that the second carriage is movable in the third direction with respect to the first carriage. The tool rest of the second tool rest means is then supported by the second carriage so that it is movable in both the second and third directions, the second direction being in complete accord with the first direction.

Where the headstock is movable in the fourth direction and both the first and second tool rest means are immovable in the same direction, there are preferably provided a bed means including a first guide path which extends in the fourth direction and on which the headstock is slidably mounted and a second guide path which is disposed in front of the headstock to extend in the first direction and on which said first carriage is slidably mounted, the first carriage having a guide path which extends in the third direction and on which the second carriage is slidably mounted More preferably, the bed means includes a bed on which the first guide path is provided and a base mount which is disposed in front of the bed and on which the second guide path in provided. The base mount may have a guide bush for the workpiece, an axis of the guide bush being in accordance with the longitudinal axis of the spindle.

On the other hand, where both the first and second tool rest means are movable in the fourth direction and the headstock is immovable in the same direction, there are preferably provided a bed on which the headstock is fixedly mounted and a base mount which is disposed in front of the bed means to be movable in the fourth direction. The base mount has guide path which extends in the first direction and on which the first carriage is slidably mounted. The base mount may have a guide bush for the workpiece, an axis of which is in accordance with the longitudinal axis of the spindle. In this case, the numerical control unit preferably has a bi-axis interpolation function for carrying out a working operation in the bi-axis interpolation mode in both the first and fourth directions and/or in both the third and fourth directions.

There are preferably provided three drive motors, such as a stepping motor and an AC or DC servo motor, which are individually driven under a control of the numerical control unit so as to move the first carriage in the first direction, the second carriage in the third direction, and the base mount in the fourth direction, respectively.

In the present invention, the numerical control unit preferably has a function corresponding to the bi-axis interpolation function for simultaneously moving the tool rest of the second tool rest means in both the second and third directions, whereby a selected one of the tools thereof is quickly moved to a predetermined position.

BRIEF DESCRIPTION OF THE DRAWINGS

These and other objects of the present invention will be better understood from the following description, with reference to the accompanying drawings, in which:

FIG. 2 is an enlarged longitudinal sectional view of a main portion of the numerical control machine shown in FIG. 1;

FIG. 3 is a cross sectional plan view taken along the line 3—3 of FIG. 2;

FIG. 4 is a front view of the numerical control machine of FIG. 2, some portions of which are shown as a partial sectional view;

FIG. 15 is a schematic perspective view of a fourth embodiment of a numerical control machine according to the present invention.

DESCRIPTION OF THE PREFERRED EMBODIMENTS

Figure 1:
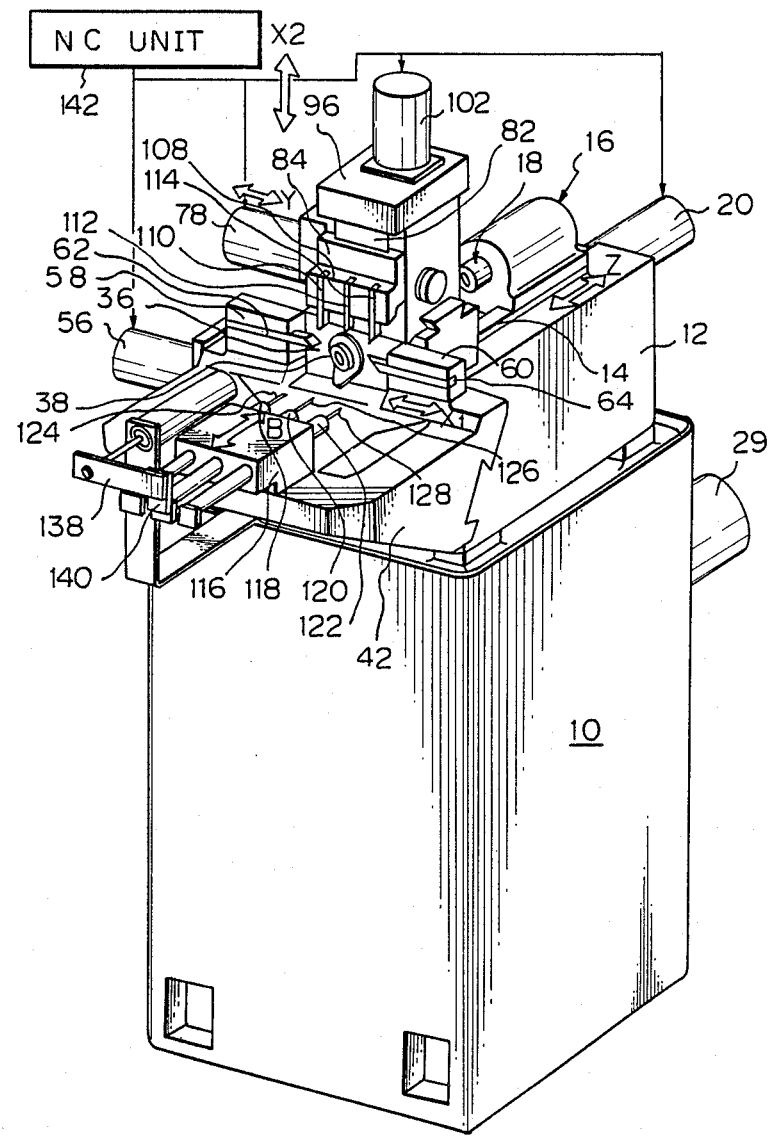
FIG. 1 is a schematic perspective view of a first embodiment of a numerical control machine according to the present invention.

Referring to FIGS. 1 to 5, there is shown a first embodiment of an NC machine according to the present invention, which comprises a machine frame 10 and a bed 12 mounted thereon. The bed 12 is provided with a guide path 14 on which a headstock 16 having a spindle assembly 18 is slidably disposed. The guide path 14 extends along a longitudinal axis of the spindle assembly 18. In FIG. 1, the direction in which the headstock 16 is movable on the guide path along the axis of the spindle assembly 18 is designated by an arrow Z and will be referred to as a direction Z hereinafter.

The headstock 16 may be moved by a feed screw (not visible) in the same manner as in a conventional headstock. Particularly, the feed screw is disposed within the bed 12 in the direction Z so as to be threaded through a nut supported by the headstock 16, and is operatively connected at an end thereof to a drive motor 20 provided on the end wall of the bed 12, whereby the headstock 16 can be moved back and forth on its guide path 14 in the direction Z by rotation of the drive motor 20, and hence, the feed screw.

As shown in FIG. 2, the headstock 16 includes a housing 22 within which the spindle assembly 18 is housed. The spindle assembly 18 includes a spindle 24 which is hollow so that a rod-like workpiece can pass therethrough. The hollow spindle 24 extends through the housing 22 and is rotatably supported thereby. To this end, the spindle assembly 18 also includes bearings 26 and 28 which are provided in the opposed end walls of the housing 22, respectively. The hollow spindle 24 has a pulley 30 fixed at the rear end thereof, which pulley 30 is rotated through a transmission means such as a belt (not shown) from an electric motor 29 (FIG. 1) mounted on the machine frame 10. At the other end or fore end of the hollow spindle 24, there is provided a collet chuck 32 having clamp jaws by which the workpiece is clamped to be rotated together with the hollow spindle 24. In order to actuate the collet chuck 32 to clamp and unclamp the workpiece by the clamp jaws thereof, the collet chuck 32 is associated with a conventional holder mechanism 34 which is provided on the hollow spindle 24.

As can be seen from FIGS. 1, 2, and 4, a base member 36 is fixedly mounted on the bed 12 in front of the headstock 16 and has a bore formed at the center thereof, into which a guide bush 38 is inserted for guiding the rod-like workpiece to be extended from the hollow spindle 24.

As best shown in FIG. 1, the bed 12 is provided at the fore end thereof with an oblique guide path 40 which is formed adjacent to the base member 36. The oblique guide path 40 has a dovetail cross section, as shown in FIG. 2, and extends perpendicularly to the direction Z. A first carriage 42 is slidably disposed on the oblique guide path 40 and thus can be moved perpendicularly to the direction Z. In FIG. 1, this movement direction is designated by an arrow X1 and will be referred to as a direction X1 hereinafter.

The oblique guide path 40 has an elongated opening 44 formed along the center line thereof and the first carriage 42 has a portion 46 which extends from the bottom of the first carriage 42 through the elongated opening 44 into the interior of the bed 12. The extended portion 46 has a bore formed at the free end thereof, into which a nut 48 is fixedly inserted. On the other hand, as can be seen from FIGS. 2 and 4, a feed screw 50 is disposed within the bed 12 in the direction X1 or the horizontal direction and is supported by bearings 52 and 54 mounted in the opposed side walls of the bed 12, respectively. As can be seen from FIG. 4, the end of the feed screw 50 which is supported by the bearing 52 has a portion which s projected therefrom into a box-like part 53 fixed to the side wall of the bed 12. A drive motor 56 for rotating the feed screw 50 is fixedly mounted on the box-like part 53. The projected portion is operatively connected to an output shaft of the drive motor 56 by means of a coupling sleeve 55, and the feed screw 50 is threaded through the nut 48 so that the first carriage 42 is driven along the oblique guide path 40 (direction X1) by rotation of the drive motor 56, and hence, the feed screw 50.

As can be seen from FIGS. 1 and 2, two tool rests 58 and 60 by which tool bits 62 and 64 are held, respectively, are fixedly mounted on the first carriage 42 and are disposed on the respective sides of the guide bush 38, opposing each other, so that the workpiece passes between the tool bits 62 and 64. It can be easily understood that, in operation and depending upon a rotational direction of the drive motor 52, one of the tool bits 62 and 64 is brought close to the workpiece projected from the guide bush 38. The tool rest 58 and 60 may be provided with a turret head by which same tool bits are held.

The base member 36 having the guide bush 38 also serves as a bed for a second carriage 66. Particularly, the second carriage 66 is slidably disposed on a guide path 68 formed on the base member 36. The guide path 68 has a dovetail cross section, as shown in FIG. 2, and extends perpendicularly to the direction Z and in parallel to the direction X1. In FIG. 1, the direction in which the second carriage 66 is moved along the guide path 68 is designated by an arrow Y and will be referred to as a direction Y hereinafter.

The second carriage 66 is driven along the guide path 68 in substantially the same manner as for the first carriage 42. Particularly, a feed screw 70 is disposed within the second carriage 68 in the direction Y, or the horizontal direction, to be threaded through a nut 72 supported by the second carriage 66. As shown in FIG. 4, one end portion of the feed screw 70 is projected from the corresponding side wall of the carriage 66 and is supported by a bearing 74 which is provided in a box-like part 76 fixed to the base member 36. The box-like part 76 supports a drive motor 78 having an output shaft connected to the end portion of the feed screw 70 within the box-like part 76 by means of a coupling sleeve 80. With the arrangement mentioned above, the second carriage 66 is driven along the guide path 68 apart from and toward the drive motor 78, depending upon the rotational direction thereof.

The second carriage 66 has a guide path 82 formed on the front surface thereof, on which a third carriage 84 is slidably disposed. The guide path 82 also has a dovetail cross section, as best shown in FIG. 3, and extends perpendicularly to both directions Z and X1. In FIG. 1, the direction in which the third carriage 84 is moved along the guide path 82 is designated by an arrow X2 and will be referred to as a direction X2 hereinafter.

The third carriage 84 is also driven along the guide path 82 in substantially the same manner as for the first carriage 42. Particularly, the guide path 82 has an elongated opening 86 formed along the center line thereof, and the third carriage 84 has a portion 88 which extends from the bottom of the third carriage 84 through the elongated opening 86 into the interior of the second carriage 66. The extended portion 88 has a bore formed at the free end thereof, into which a nut 90 is fixedly inserted. A feed screw 92 is disposed within the second carriage 66 in the direction X2 or the vertical direction. As shown in FIG. 2, the feed screw 92 is supported at one end by and suspended from a bearing 94 which is provided in a box-like part 96 mounted on the top of the second carriage 66. The feed screw 92 also has an extended portion 98 which is projected from the bearing 94 and on which a pulley 100 is fixedly mounted. The portion of the box-like part 96 which is projected from the top of the second carriage 66 supports a drive motor 102 mounted on the top thereof in such a manner that the output shaft of the drive motor 102 extends into the projected portion of the box-like part 96. The output shaft of the drive motor 102 has a pulley 104 fixedly mounted thereon. As can seen from FIG. 2, a transmission belt 106 is entrained on the pulleys 100 and 104 so that the pulley 100 is driven by the drive motor 102. Thus, the third carriage 84 is driven along the guide path 82 apart from and toward the bearing 94, depending upon a rotational direction of the drive motor 102.

As can seen from FIGS. 1 to 4, a tool rest 108, which holds three tool bits 110, 112, and 114, is fixedly mounted on the third carriage 84. The three tool bits 110, 112, and 114 are vertically disposed and are equally spaced apart from each other. It can be easily understood that, in operation, one of the three tool bits 110, 112, and 114 is brought close to the workpiece by actuating the drive motors 78 and 102.

Figure 5:
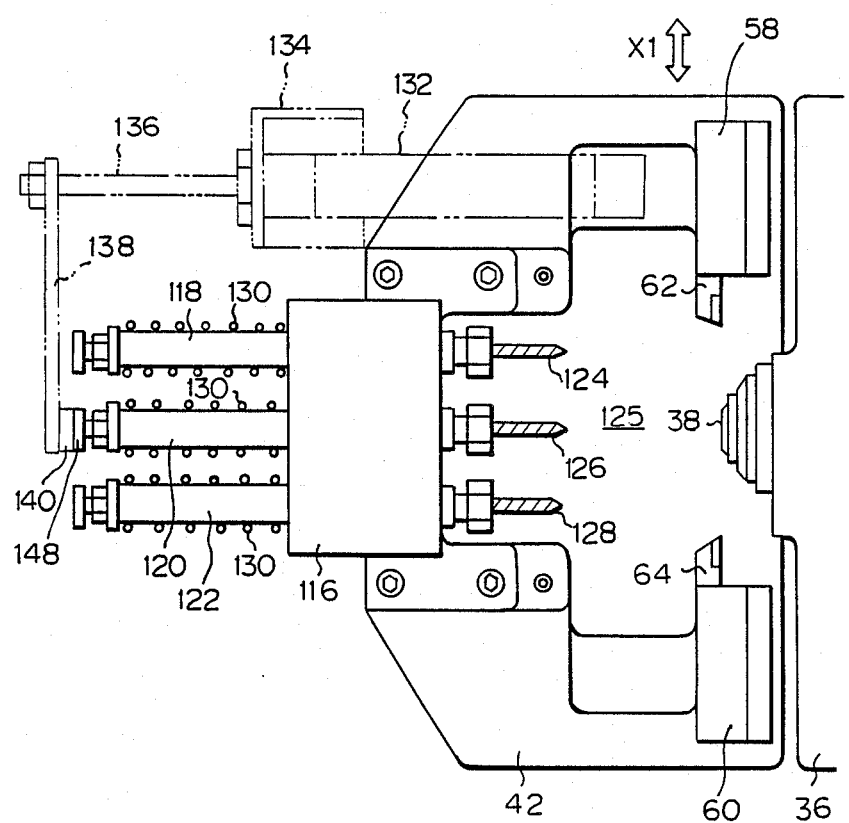
FIG. 5 is an enlarged partial plan view of the numerical control machine of FIG. 1, in which a first carriage of the machine and additional tools supported thereby are illustrated, a selected one of the additional tools being projected from a retracted position to a working position.

In order to increase a working ability of the NC machine, an additional tool rest 116 holding three drilling tool holders 118, 120, and 122, may be provided on the first carriage 42, as shown in FIGS. 1, 2, and 5. The tool rest 116 is fixedly mounted on the first carriage 42 at the fore end thereof so that a trough 125 for receiving cutting scraps can be formed in the first carriage 42 between the tool rest 116 and the guide bush 38 for the workpiece. To hold the drilling tool holder 118, 120, and 122, the tool rest 116 has three bores for slidably receiving the drilling tool holders 118, 120, and 122. As shown, the three bores are formed in the tool rest 116 so that the axes thereof are in parallel to each other and in parallel to the direction Z, whereby each of the drilling tool holders 118, 120 and 122 is movable in the direction Z. In FIG. 1, the direction in which the drilling tool holders 118, 120 and 122 is moved is designated by an arrow B and will be referred to as a direction B hereinafter.

Drilling tools 124, 126, and 128 are detachably held by the drilling holders 118, 120, and 122, respectively, as best shown in FIG. 5. In this embodiment, in place of the drilling tools 124, 126 and 128, another tool such as a top or a reamer may be used. Each of the drilling tool holders 118, 120 and 122 is moved together with the corresponding drilling tool in the direction B between a retracted position as shown in FIGS. 2 and 5 and a working position where it is projected from the retracted position toward the guide bush 38. As shown in FIGS. 2 and 5, a compressed coil spring 130 is provided on each of the drilling tool holders 118, 120, and 122 so that they are commonly in the retracted position. In order to drive the drilling tool holder with the drilling tool from the retracted position to the working position, a hydraulic actuator 132 is used which is supported by a bracket 134 fixedly mounted on the bed 12. The hydraulic actuator 132 includes a piston rod 136 which can be reciprocated in the direction B. The piston rod 136 has an arm 138 fixedly connected at its free end, which extends perpendicularly to the axis of the piston rod 136. The arm 138 then has a pusher element 140 fixedly attached at the free end thereof, which is positioned so that the center thereof is registered with the center of the guide bush 38 or the workpiece.

It can be easily understood that, in operation, one of the drilling tools 124, 126, and 128 is aligned with the center axis of the guide bush by moving the first carriage 42 in the direction X1 so that the pusher element 140 is registered with a head 141 of the corresponding tool holder, and is then moved from the retracted position to the working position by actuating the pusher element 140 with the hydraulic actuator 132. It should be also understood that the arrangement of the tool bits 62 and 64 is such that they do not interfere with the workpiece projected from the guide bush 38, when the outer drilling tools 124 and 128 are aligned with the center of the guide bush 38.

As shown in FIG. 1, the drive motors 20, 56, 78, and 102 are controlled by a numerical control unit 142 which feeds driving pulses to the drive motors 20, 56, 78, and 102 in accordance with a predetermined working program. It should be noted that, in addition to ordinary functions and a well known bi-axis interpolation function, the NC unit 142 has a simultaneous tri-axis interpolation function as defined hereinafter, whereby the NC machine can be used for various working operations.

According to the arrangement of the NC machine as described above, it is possible to advantageously and effectively carry out various working operations.

In the working operations of the NC machine mentioned above, first, the rod-like workpiece is passed through the hollow spindle 24 and the guide bush 38 so that a portion of the workpiece to be worked is projected from the guide bush 38 and is then clamped by the collet chuck 32 for rotation, whereby the machine becomes ready for the working operation.

In an ordinary working operation which does not need an interpolation motion for circular-shaping, tapering or the like of the workpiece, it is determined which of the tool bits is selected for the working operation. For example, when one of the tool bits 62 and 64 is selected, the headstock 16 and the first carriage 42 are moved in the directions Z and X1, respectively, by driving the drive motors 20 and 56 under the control of the NC unit 142, whereby the workpiece is worked and shaped into an ordinary configuration such as a cylindrical shape by the selected tool bit in accordance with a given working program. On the other hand, when one of the tool bits 110, 112, and 114 is selected, the workpiece is worked and shaped by the selected tool bit in substantially the same manner, except that the headstock 16 and the third carriage 84 are moved in the directions Z and X2, respectively, by driving the stepping motors 20 and 102 under the control of the NC unit 142.

Figure 6:
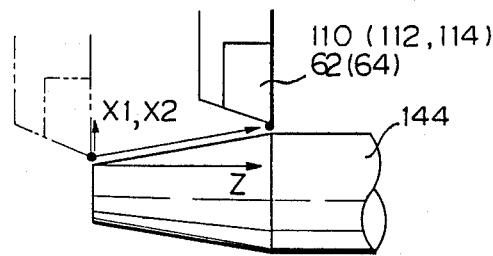
FIG. 6 is a schematic illustration for explaining an example of a working operation which is carried out by the numerical control machine of FIG. 1.

Some examples of a working operation which involve an interpolation motion for circular-shaping, tapering or the like of the workpiece will be described below:

(1) For an interpolation motion in the directions Z and X1 or the directions Z and X2:

Referring to FIG. 6, an example is shown in which a workpiece 144 is tapered. In order to carry out the tapering of the workpiece 144 by the working operation which involves the interpolation motion in the directions Z and X1, one of the tool bits 62 and 64 is first selected for the working operation. For example, when the tool bit 62 is selected, the first carriage 42 is moved in the direction X1 toward the workpiece 144 by driving the drive motor 56 under control of the NC unit 142 until the tool bit 62 is set at an initial working position in a front of the workpiece end face. Then, the headstock 16 is forwardly moved in the direction Z by driving the drive motor 20 under the control of the NC unit 142, and the first carriage 42 is moved in the direction X1 apart from the initial working position by driving the drive motor 56 under the control of the NC unit 142. In this case, it is a matter of course that both the movement of the headstock 16 in the direction Z and the movement of the first carriage 42 in the direction X1 are achieved in the well known bi-axis interpolation mode so that the tapering is carried out on the workpiece 144 as shown in FIG. 6. On the other hand, it can be easily understood that, in order to carry out the tapering as mentioned above, the tool bit 64 may be used in substantially the same manner as for the tool bit 62.

In order to carry out the tapering on the workpiece 144 by the working operation which involves the interpolation motion in the directions Z and X2, one of the tool bits 110, 112, and 114 is first selected for the working operation. For example, when the tool bit 110 is selected, the second and third carriages 66 and 84 are moved in the directions Y and X2 by driving the drive motors 78 and 102, respectively, under the control of the NC unit 142 so that the tool bit 110 is set at the initial working position in front of the workpiece end face. Then, the headstock 16 is forwardly moved in the direction Z by driving the drive motor 20 under the control of the NC unit 142, while the third carriage 84 is moved upward in the direction X2 away from the initial working position by driving the drive motor 102 under the control of the NC unit 142. Also, in this case, both the movement of the headstock 16 in the direction Z and the movement of the third carriage 84 in the direction X2 are achieved in the well known bi-axis interpolation mode so that the tapering as shown in FIG. 6 can be obtained. The same is true for the tapering of the workpiece 144 by one of the remaining tool bits 112 and 114.

Figure 7A:
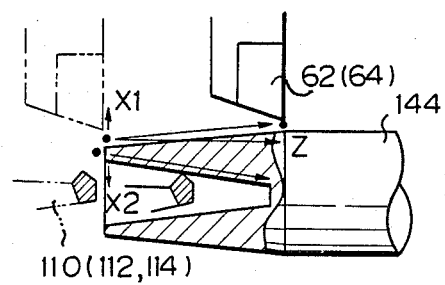
FIGS. 7(a) and 7(b) are a schematic illustration for explaining another example of a working operation which is carried out by the numerical control machine of FIG. 1.
Figure 7B:
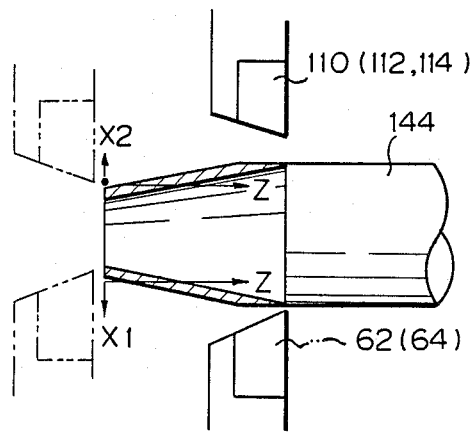

(2) For an interpolation motion in the directions Z, X1 and X2:

Referring to FIGS. 7(a) and (b), examples are shown in which two different working operations involving the interpolation motion are simultaneously carried out. Particularly, in FIG. 7(a), one of the tool bits 110, 112 and 114 is used to carry out a finishing cut in an axial taper bore which is made in the workpiece 144, and one of the tool bits 62 and 64 is used to carry out a tapering of the outer surface of the workpiece 144. On the other hand, in FIG. 7(b), one of the tool bits 110, 112 and 114 is used to carry out a roughing cut for tapering the workpiece 144, and one of the tool bits 64, and 64 is used to carry out a finishing cut of the roughly cut taper surface of the workpiece. Thus, in the example as shown in FIGS. 7(a) and 7(b), it can be said that the NC machine executes the working operation in a simultaneous tri-axis interpolation mode, because both the working operation in the directions Z and X1 and the working operation in the directions Z and X2 are simultaneously achieved in the bi-axis interpolation mode through the intermediary of the axis (the spindle axis) of the direction Z. In addition, in the example of FIG. 7(a), it is a matter of course that the tool bits 110, 112 and 114 may be used to carry out the finishing cut of the axial taper bore of the workpiece 144, whereas the tool bits 62 and 64 may be used to carry out the finishing cut of the tapering of the outer surface of the workpiece 144. The same is also, true for the example of FIG. 7(b).

In the examples as mentioned above, as an instance of the working operations involving the interpolation motion, reference has been made to only the tapering. It should be understood, however, that other shapings such as a circular-shaping also can be performed under the control of the NC unit 142 in a similar manner.

Figure 8:
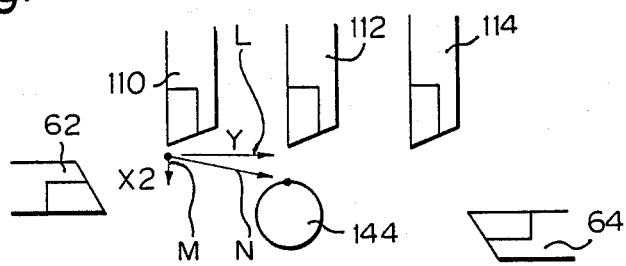
FIG. 8 is a schematic illustration for explaining an example of a quick positioning of a tool to an initial working position, which is carried out by the numerical control machine of FIG. 1.

When the working operation is carried out by use of a selected one of the tool bits 110, 112, and 114, the setting of the selected tool bit at the initial working position may be achieved by simultaneously moving the second and third carriages 66 and 84 in the directions Y and X2, respectively. In other words, the selected tool bit may be set at the initial working position by simultaneously moving the tool rest 108 in the directions Y and X2, as shown in FIG. 8. It should be noted that this setting is very advantageous in that the selected tool bit is quickly moved to the initial working position. In FIG. 8, an arrow L designates a distance by which the selected tool bit 110 is moved in the direction Y, an arrow M designates a distance by which the tool bit 110 is moved in the direction X2, and an arrow N designates a distance by which the tool bit 110 is actually moved to the initial working position in a direction depending upon the simultaneous or resultant movement of the arrows L and M.

Where the workpiece is successively subjected to the various working operations, it is expedient to alternatively use one of the tool bits 62 and 64 and one of the tool bits 110, 112 and 114, because while the workpiece is worked by, for example, one of the tool bits 62 and 64, one of the tool bits 110, 112 and 114 can be on standby in the vicinity of the initial working position thereof for the successive working operation, and vice versa. This is advantageous because it is thus possible to minimize the idling time of the NC machine by shortening the access time for bringing the tool bit to the workpiece. Of course, it is necessary to move the selected tool bit to the standby position so that it does not interfere with the tool bit in working operation.

The simultaneous or resultant movement of the tool rest 108 in both the directions Y and X2 may be obtained by utilizing a function corresponding to the bi-axis interpolation function. In other word, the tool rest 108 may be moved in the directions Y and X2 in the bi-axis interpolation mode under the control of the NC unit 142, whereby one of the tool bits 110, 112, and 114 held by the tool rest 108 can be moved along the shortest path to the standby position and the initial working position.

Drilling operations which are carried out by the drilling tools 124, 126, and 128 will be now described.

Since the tool rest 116 for the drilling tools 124, 126, and 128, and the tool rests 58 and 60 for the tool bits 62 and 64, are fixedly mounted on the first carriage 42, it is impossible to carry out the working operation by simultaneously using one of the drilling tools 124, 126, and 128 and one of the tool bits 62 and 64. It is, however, possible to carry out the working operation by simultaneously using one of the drilling tools 124, 126, and 128 and one of the tool bits 110, 112 and 114 held by the tool rest 108.

In a drilling operation for drilling an axial bore in the workpiece, first, one of the drilling tools 124, 126 and 128 is selected. The selected drilling tool is then moved along the direction X1 to be aligned with the longitudinal axis of the workpiece by driving the drive motor 56 for the carriage 42 under the control of the NC unit 142. Then, the drilling tool holder of the aligned drilling tool is pushed in the direction B by driving the hydraulic actuator 132 so that the drilling tool is projected from the retracted position to the working position. On the other hand, the drive motor 20 for the headstock 16 is driven under the control of the NC unit 142 so that the workpiece is moved forward along the direction Z under the control of the NC unit 142, whereby the drilling is carried out so as to form the axial bore in the workpiece.

Figure 9A:
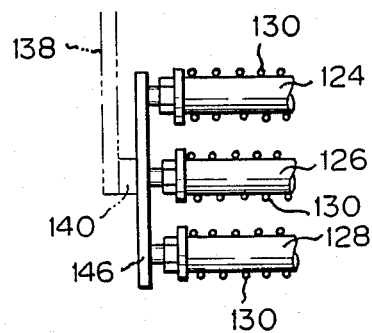
FIGS. 9(a) and 9(b) are a schematic illustration showing that the additional tools as shown in FIG. 5 may be projected from the retracted position to the working position in a different manner.
Figure 9B:
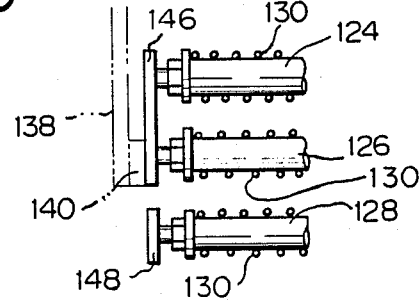

It is also possible to use two of the drilling tools 124, 126, and 128 to carry out a roughing drilling and a finishing drilling of the workpiece. In this case, one of the drilling tools 124, 126, and 128 is used in substantially the sam manner as for the above-mentioned drilling for carrying out the roughing drilling. Then, the headstock 16 is moved backward in the direction Z by driving the drive motor 20 under the control of the NC unit 142, and the drilling tool used in the roughing drilling is returned to the retracted position by releasing the drilling tool holder thereof from the action of the hydraulic actuator 132. Thereafter, the drive motor 56 is driven to move the first carriage 42 in the direction X1 so that the drilling tool for use in the finishing drilling is aligned with the longitudinal axis of the workpiece. The drilling tool holder of the aligned drilling tool is pushed in the direction B by driving the hydraulic actuator 132 so that the drilling tool is projected from the retracted position to the working position. On the other hand, the drive motor 20 for the headstock 16 is driven under the control of the NC unit 142 so that the workpiece is moved forward along the direction Z under the control of the NC unit 142, whereby the roughly drilled bore is subjected to finishing drilling.

Where the drilling tools are successively used for the drilling operation, as shown in the latter example, it is expedient that all of the drilling tools 124, 126 and 128 be projected from the retracted positions to the working position and then maintained thereat because it is thus possible to eliminate the access time for projecting and returning the drilling tool, so that the idling time of the NC machine can be minimized. To this end, in the embodiment as shown in FIG. 9(a), an elongated plate member 146 is fixed to the rear ends of the three drilling tool holders 118, 120 and 122, so that it is engaged with the pusher element 140 whereby they can be simultaneously pushed in the direction B so that all of the drilling tools 124, 126, and 128 are projected from the retracted position and are maintained at the projected position. It can be easily understood that each of the drilling tools 124, 126, and 128 maintained at the projected position can be set at the working position by driving the drive motor 56 for moving the first carriage 42. FIG. 9(b) shows a modification of the embodiment as shown in FIG. 9(a), wherein an elongated plate member 146 is fixed to the rear ends of the adjacent tool holders 118 and 20, the rear end of the drilling tool holder 112 being headed by a plate member 148. With this arrangement, when the pusher element 140 is engaged with the elongated plate member 146 and is actuated by the hydraulic actuator 132, the drilling tool holders 118 and 120 are simultaneously pushed in the direction B so that the adjacent tools 124 and 126 thereof are projected from the retracted position and are maintained at the projected position. Similarly, it is possible to set one of the projected drilling tools by driving the drive motor 56. The pusher element 140 is also engageable with the plate member 148 when the corresponding drilling tool 128 is aligned with the longitudinal axis of the workpiece by driving the drive motor 56. The aligned drilling tool 128 can be set at the projected position or the working position by actuating the hydraulic actuator 132.

Figure 10:
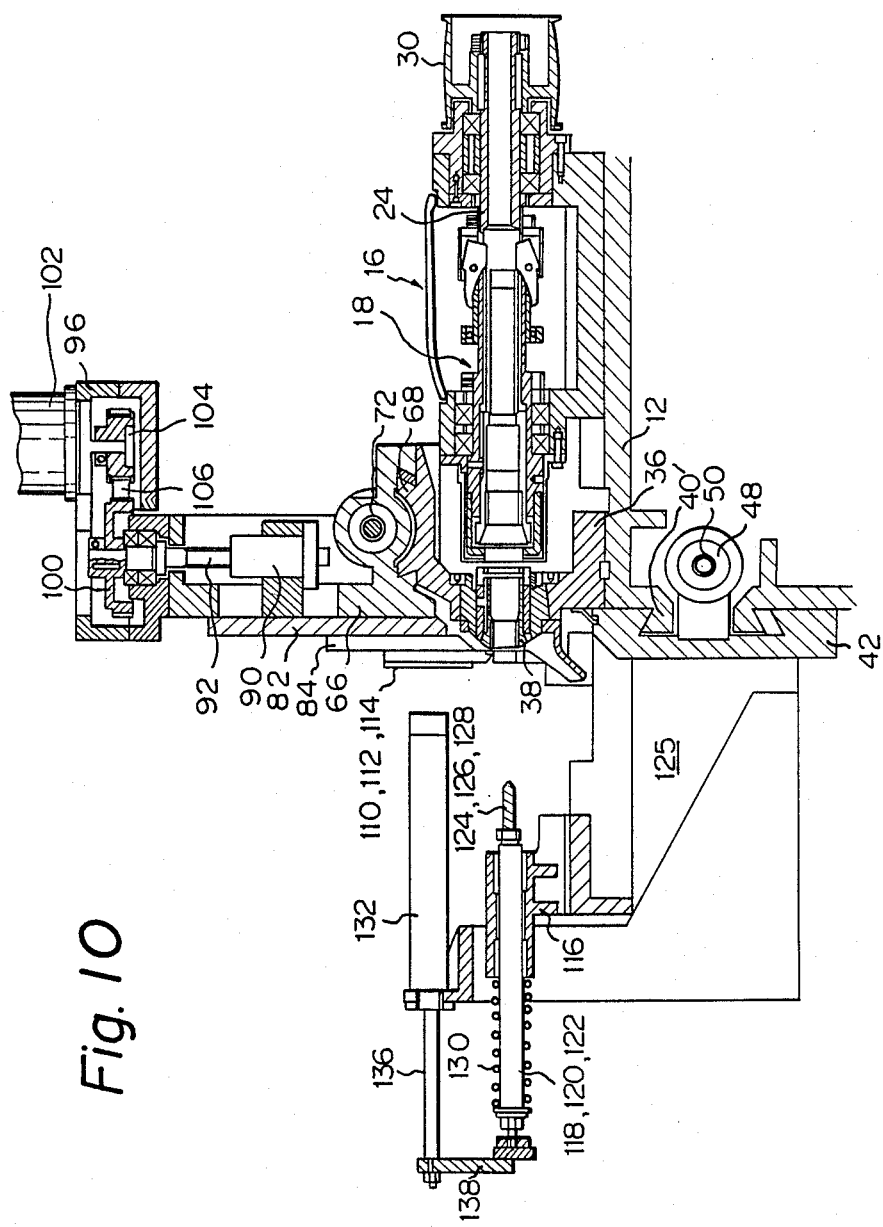
FIG. 10 is a view similar to FIG. 2, in which a modification of the first embodiment of FIGS. 1 to 5 is shown.

Referring to FIG. 10, there is shown a modification of the first embodiment as shown in FIGS. 1 to 5. In FIG. 10, the same reference numerals as in FIGS. 1 to 5 represent the same elements. Both these embodiments are identical except that the guide path 40' for the first carriage 42 is vertically formed on the forward end wall of the bed 12. In the first embodiment, the oblique guide path 40 is preferable in that it presents two supporting surfaces to the first carriage 42 due to the obliqueness of the dovetail structure thereof. Thus, a supportability of the first carriage 42 which is obtained by the oblique guide path 40 is superior to the vertical guide path 40' which presents one supporting surface to the first carriage. Nevertheless, the vertical guide path 40' is preferable in that it can be more easily worked on the bed wall than the oblique guide path, and can facilitate removal of the cutting scraps.

Figure 11:
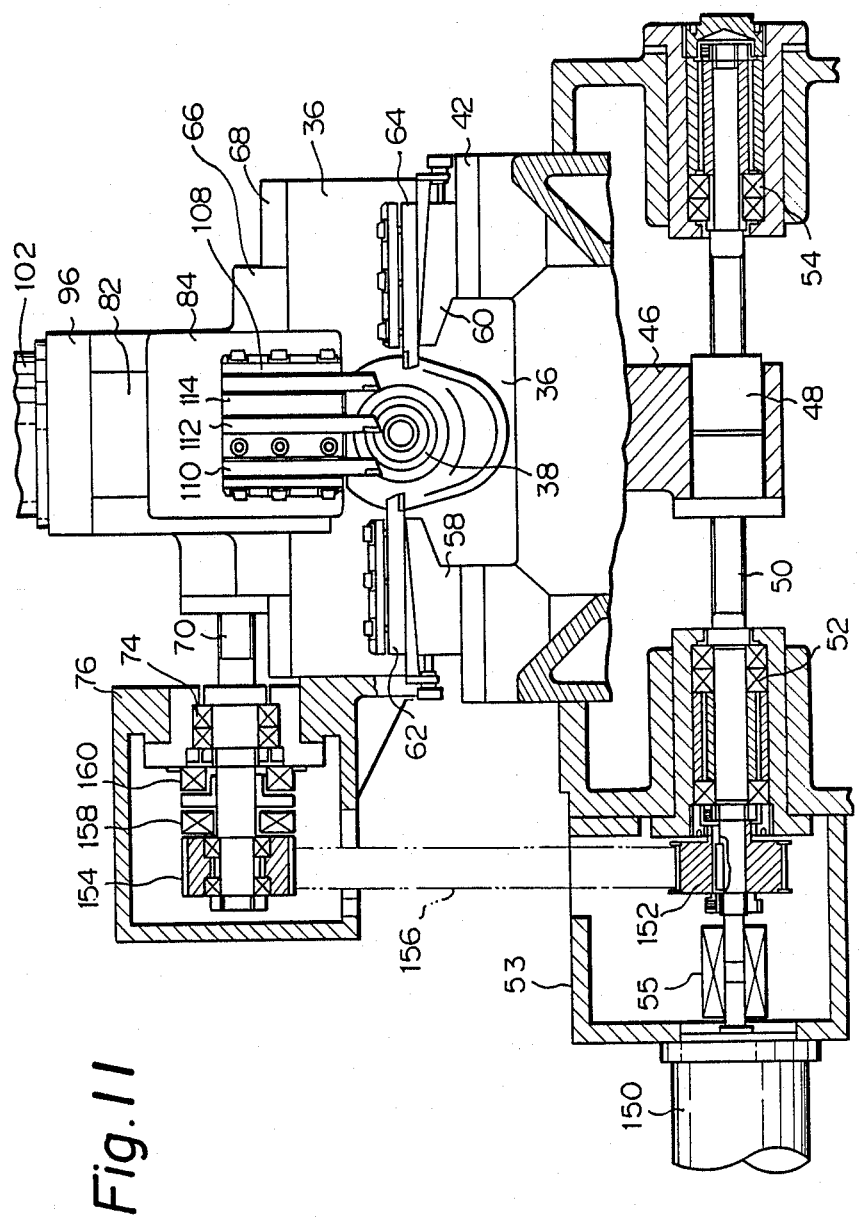
FIG. 11 is a view similar to FIG. 4, in which a modification of the first embodiment is shown.

FIG. 11 shows another modification of the first embodiment of FIGS. 1 to 5. In FIG. 11, the same reference numerals as in FIGS. 1 to 5 represent the same elements. In the first embodiment, the first and second carriages 42 and 66 are individually driven by the drive motors 56 and 78, respectively. In this modified embodiment, however, the first and second carriages 423 and 66 are driven by a common drive motor 150.

Particularly, the common drive motor 150 is fixedly mounted on the box-like part 53 in the same manner as for the drive motor 56 so that the output shaft is connected by means of the coupling sleeve 55 to the end portion of the feed screw 50 which is projected from the bearing 52. The projected end portion of the feed screw 50 is provided with a pulley 152 which is disposed between the coupling sleeve 55 and the bearing 52. On the other hand, the end portion of the feed screw 70, which is projected from the bearing 74 into the box-like part 76, is provided with a pulley 154 operatively connected to the pulley 152 through a toothed transmission belt 156. The projected end portion of the feed screw 70 is also provided with a clutch 158 and a brake 160, which are disposed between the pulley 154 and the bearing 74. In this case, the tool bits 62 and 64 are sufficiently spaced apart from each other such that they do not interfere with the workpiece which is worked by using one of the tool bits 110, 112, and 114.

In order to move a selected one of the tool bits 110, 112, and 114 in the direction Y, to be set, for example, at a position just above the workpiece axis, the clutch 158 and the brake 160 are made ON and OFF, respectively. In this way, the second carriage 66 can be moved in the direction Y by driving the drive motor 150 (the first carriage 42 is also moved in the direction X1) so that the selected tool bit can be brought close to the predetermined position. When the selected tool bit reaches the predetermined position, the clutch 158 and the brake 160 are made OFF and ON, respectively, so that the selected tool bit is stopped and maintained at the predetermined position in the direction Y.

On the other hand, when the clutch 158 and the brake 160 are made OFF and ON, respectively, the drive motor 150 can be used only to move the first carriage 42 in the direction X1. Accordingly, in the modified embodiment of FIG. 11, it is also possible to carry out the working operation by the simultaneous use of both one of the tool bits 62 and 64 and one of the tool bits 110, 112, and 114. If, however, this simultaneous use is omitted, it is possible to eliminate the clutch 158 and brake 160 from the arrangement of the embodiment as shown in FIG. 11.

In addition, when one of the tool bits 62 and 64 or one of the tool bits 110, 112, and 114 is used for the working operation, it is impossible to move one of the tool bits 110, 112, and 114 or one of the tool bits 62 and 64 to the standby position. Nevertheless, the NC machine according to this modified embodiment can be produced at a lower cost in comparison with the first embodiment because the number of drive motors which must be subjected to the numerical control is reduced by one.

Figure 12:
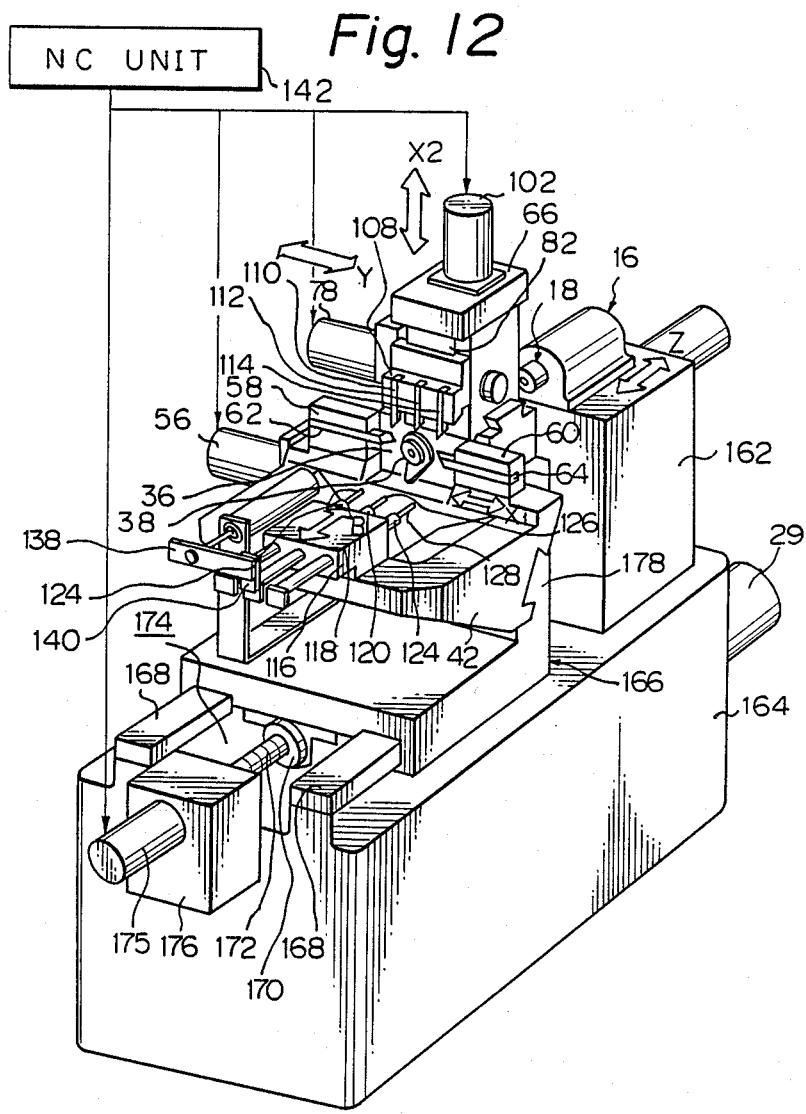
FIG. 12 is a schematic perspective view of a second embodiment of a numerical control embodiment according to the present invention.

Referring to FIG. 12, a second embodiment is shown of the NC machine according to the present invention.

In FIG. 12, the same reference numerals as in FIGS. 1 to 5 represent the same elements. The first and second embodiments are generally identical, but the second embodiment is distinctly different from the first embodiment in that the headstock 16 is immovably mounted on a base mount 162 fixedly installed on the machine frame 164, and in that the assembly including the first, second, and third carriages 42, 66, and 84 and the base member 36 for supporting the second carriage 66 is installed on a movable base mount 166.

As can be seen from FIG. 12, the base mount 166 is slidably disposed on a pair of guide rails 168 forming a guide path. The guide rails 168 are formed on the machine frame 164 so that they extend along the longitudinal axis (direction Z) of the spindle assembly 18 and in parallel to each other. In short, the base mount 166 is movable in the direction Z on the guide path formed from the guide rails 168.

In order to drive the base mount 166 along the guide rails 168, a nut 170 is fixedly mounted on the bottom thereof, through which a feed screw 172 is threaded. Particularly, a groove 174 is formed in the base mount 166 in parallel to the guide rails 168 therebetween. The feed screw 172 extends within the groove 174 in the direction Z, and the nut 170 is projected from the bottom of the base mount 166 into the groove 174 so that the feed screw 172 can be threaded through the nut 170. On the other hand, a drive motor 175 for rotating the feed screw 172 is attached to a reduction gear box 176 which is fixedly mounted on a forward side wall of the machine frame 164. One end portion of the feed screw 172 is supported by a bearing (not shown) provided in the reduction gear box 176 and is operatively connected to the drive motor 174 through the reduction gears (not shown) thereof, whereby the base mount 166 can be moved on the guide rails 168 in the direction Z by driving the drive motor 175 under the control of the NC unit 142.

As shown in FIG. 12, the base mount 166 has an upright wall 178 which extends vertically and upwardly therefrom. The upright wall 178 is provided with a guide path (not shown) which may be constructed in the same manner as the guide path 40 of the first embodiment. Also, the first carriage 42 is slidably disposed on the guide path and is driven by the drive motor 56 in the same manner as in the first embodiment.

The base member 36 is securely mounted on the upright wall 178 so that the center axis of the guide bush 38 is in accordance with the longitudinal axis of the spindle assembly 18. The second carriage 66 is provided on the base member 36 in the same manner as in the first embodiment, and the third carriage 84 is also provided on the second carriage 66 as in the first embodiment.

With arrangement mentioned above, it can be easily understood that the NC machine according to the second embodiment can carry out various working operations, as for the NC machine according to the first embodiment.

Figure 13:
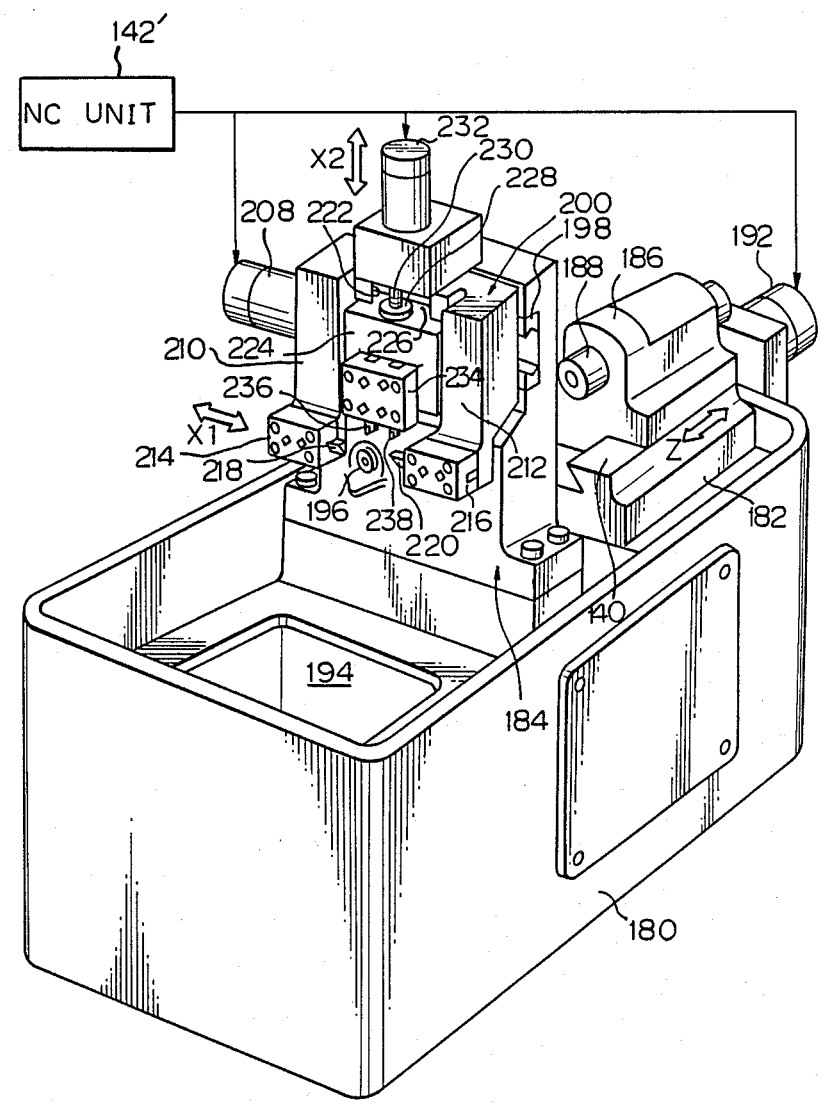
FIG. 13 is a schematic perspective view of a third embodiment of a numerical control machine according to the present invention.
Figure 14:
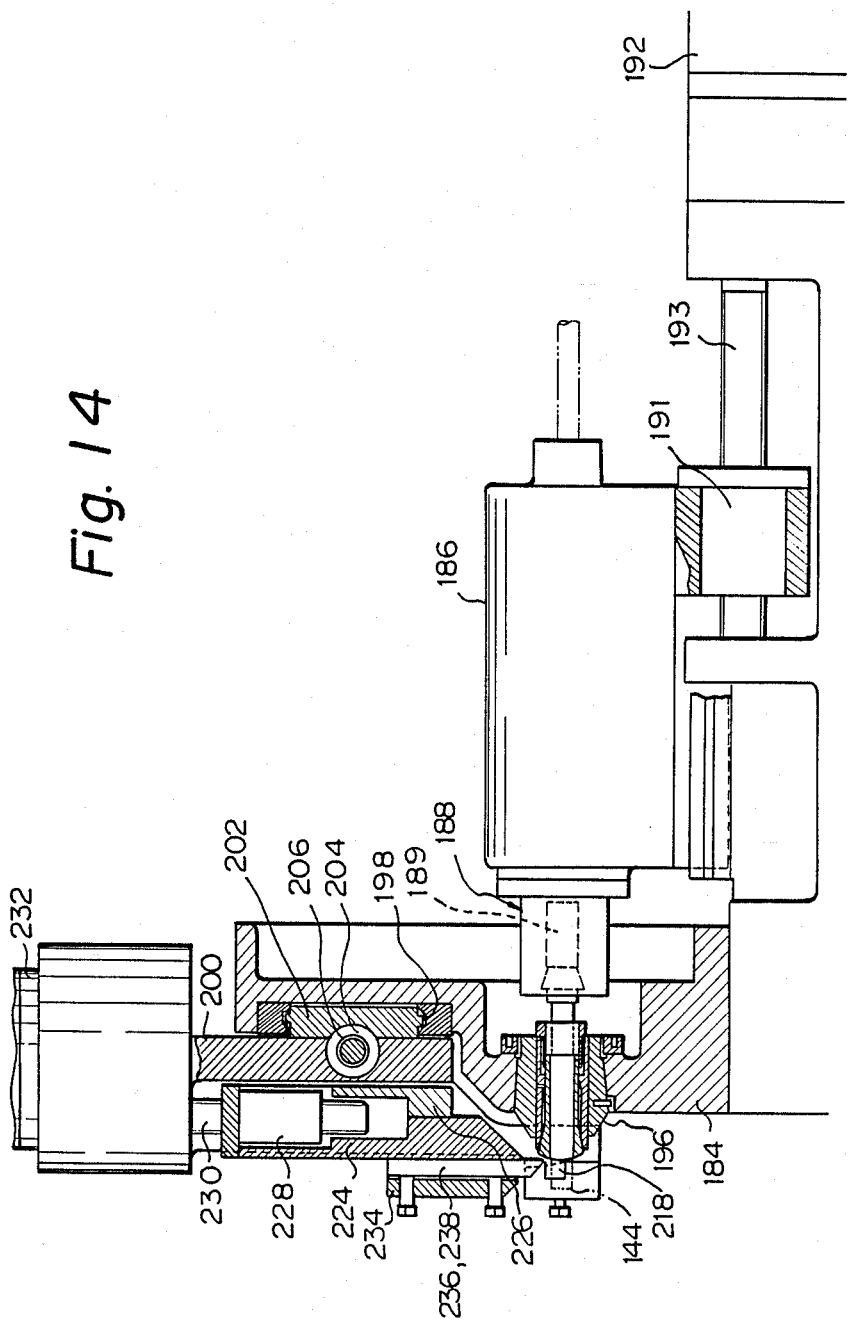
FIG. 14 is an enlarged longitudinal sectional view of a main portion of the third embodiment shown FIG. 13.
Figure 15:
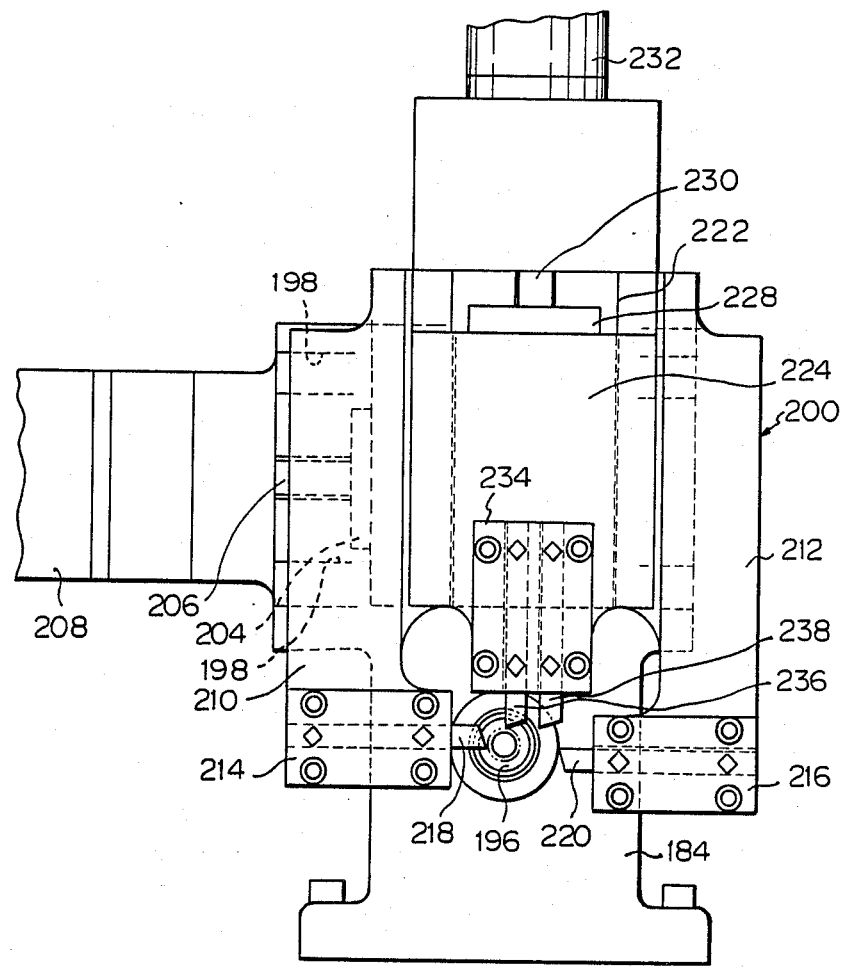
FIG. 15 is a front view of the main portion shown in FIG. 14.

Referring to FIGS. 13 to 15, a third embodiment is shown of the NC machine according to the present invention. In this third embodiment, the NC machine comprises a machine frame 180, a bed 182 fixedly mounted thereon, and a base mount 184.

A headstock 186 including a spindle assembly 188 therein is slidably disposed on a guide path 190 which is formed on the bed 182. As shown in FIG. 12, the guide path 190 extends along the longitudinal axis of the spindle assembly 188 to that the headstock 186 is movable in the direction Z as defined in the first embodiment of FIGS. 1 to 5. The headstock 186 and the spindle assembly 188 with a collet chuck 189 (FIG. 14) may be constructed in the same manner as in the first embodiment. As can be seen from FIG. 14, in order to drive the headstock 186 in the direction Z, a nut 191 is fixedly mounted on the bottom thereof, through which a feed screw 193 is threaded. Particularly, the feed screw 193 extends along the guide path 190 in the direction Z to be threaded through the nut 191 and is connected at one end to a drive motor 192, whereby the headstock 186 can be moved on the guide path 190 in the direction Z by driving the drive motor 192 under the control of an NC unit 142' (FIG. 13).

As can be seen from FIG. 13, the base mount 184 is constructed in the form of an upright wall and is disposed in the vicinity of a trough 194 for cutting scraps, which is provided in the machine frame 180. The base mount 184 has a bore into which a guide bush 196 for a workpiece 144' is inserted so that the axis thereof is in accordance with the longitudinal axis of the spindle assembly 188, and hence, the workpiece 144'.

The base mount 184 has a guide path or a guide groove 198 which is formed in the front surface thereof perpendicularly to the direction Z. In other words, the guide groove 198 extends in the direction X1 as defined in the first embodiment. As shown in FIG. 14, a first carriage 200 has a guided portion 202 which is slidably received in the guide groove 198 so that the first carriage 200 can be moved along the guide groove 198 in the direction X1.

In order to drive the first carriage 200 in the direction X1, a nut 204 is provided into which a feed screw 206 is threaded and which is connected at one end to a drive motor 208 fixedly mounted on the side wall of the first carriage 200. Particularly, as can be seen from FIG. 14, the nut 204 is fixedly inserted into a bore which is formed in the first carriage 200 and which extends in the direction X1, and the fed screw 206 extends into the bore and is threaded through the nut 204, whereby the first carriage 200 can be moved along the guide groove 198 in the direction X1 by driving the drive motor 208 under the control of the NC unit 142'.

The first carriage 200 has a recess provided on the front surface thereof to extend vertically or perpendicularly to the direction X1 so that two arm-like portions 210 and 212 are formed at the sides of the first carriage 200. The arm-like side portions 210 and 212 have tool rests 214 and 216 provided at their lower ends, respectively. As best shown in FIG. 15, the tool rests 214 and 216 by which tool bits 218 and 220 are respectively held are disposed on the sides of the guide bush 196 and opposed to each other. It can be easily understood that one of the tool bits 218 and 220 can be set at the initial working position thereof by driving the drive motor 208 under the control of the NC unit 142', that is, by moving the carriage 200 in the direction X1.

The first carriage 200 has a guide path or a guide groove 222 which is formed in the bottom of the mentioned-above recess perpendicularly to the direction X1. In other words, the guide groove 222 extends in the direction X2 as defined in the first embodiment. As can be seen from FIGS. 13 and 15, a second carriage 224 has a guided portion 226 which is slidably received in the guide groove 222 so that the second carriage 224 can be moved along the guide groove 222 in the direction X2.

In order to drive the second carriage 224 in the direction X2, a nut 228 is provided into which a feed screw 230 is threaded and which is connected at one end to a drive motor 232 fixedly mounted on the top wall of the second carriage 224. Particularly, as can be seen from FIG. 14, the nut 228 is fixedly incorporated into the second carriage 224, and the feed screw 230 extends in the direction X2 and is threaded through the nut 228, whereby the second carriage 224 can be moved along the guide groove 222 in the direction X2 by driving the drivemotor 232 under the control of the NC unit 142'.

The second carriage 224 has a tool rest 234 fixedly mounted on the lower end thereof, by which the tool bits 236 and 238 are held. It can be easily understood that one of the tool bits 236 and 238 can be set at the initial working position thereby by driving the drive motors 208 and 232 under the control of the NC unit 142', that is, by moving the tool rest 234 in the directions X1 and X2. It is also possible to simultaneously drive the drive motors 208 and 232 so that the tool rest 234 is simultaneously moved in both the directions X1 and X2, whereby a selected one of the tool bits 236 and 238 can be quickly set at the initial working position thereof. In this case, it is necessary to give the NC unit 142' a function corresponding to the bi-axis interpolation function, as mentioned above with respect to the operation of the first embodiment.

In the third embodiment, it is not intended that the working operation be carried out by simultaneously using both one of the tool bits 218 and 220 and one of the tool bits 236 and 238. Also, while the working operation is carried out by using one of the tool bits 236 and 238, it is impossible to set one of the tool bits 218 and 220 at a standby position for a successive working operation. But, while the working operation is carried out by using one of the tool bits 218 and 220, it is possible to set a selected one of the tool bits 236 and 238 at a standby position for a successive working operation by moving the tool rest 234 in the direction X2, so that the selected tool bit 236 or 238 can be immediately set at the initial working position as soon as the preceding working operation is finished. In this case, of course, the tool bits for use in the preceding working operation and the tool bits for use in the successive working operation must be held by the tool rests 214 and 216 and the tool rest 234, respectively. In short, the third embodiment wherein control axes on the tools to be numerically controlled are minimized can be advantageously used for minimizing the idling time of the machine in which the working operations are successively repeated.

In addition, it is impossible to carry out a working operation in the simultaneous tri-axis interpolation mode as defined in the first embodiment. It is, however, possible to carry out a working operation in the bi-axis interpolation mode in both the directions X1 and Z and/or in both the directions X2 and Z. To this end, the numerical control unit 142' must be given the bi-axis interpolation function.

Figure 16:
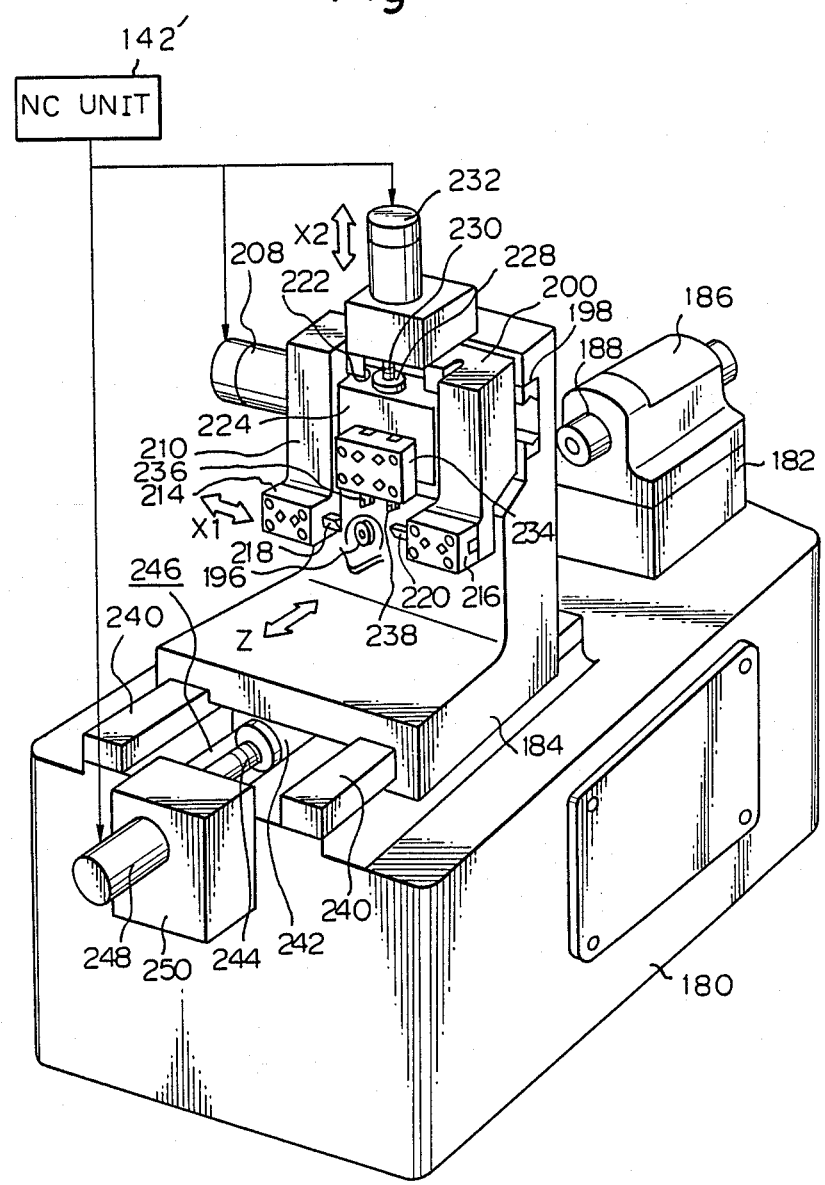

Referring to FIG. 16, a fourth embodiment is shown of the NC machine according to the present invention. In FIG. 16, the same reference numerals as in FIGS. 13 to 15 represent the same elements. The relationship between the third and fourth embodiments is similar to that between the first and second embodiments. That is, the third embodiment is different from the fourth embodiment in that the headstock 186 is immovably mounted on the bed 182 and the base mount 184 for supporting the first and second carriages 200 and 224 is movably installed on the machine frame 180. Particularly, the base mount 184 is slidably disposed on a pair of guide rails 240 forming a guide path. The guide rails 240 are provided on the top surface of the machine frame 180 so that they extend in parallel to each other along the longitudinal axis (direction Z) of the spindle assembly 188. In short, the base mount 184 is movable in the direction Z on the guide path formed from the guide rails 240.

In order to drive the base mount 184 along the guide rails 240, a nut 242 is fixedly mounted on the bottom thereof, through which a feed screw 244 is threaded. Particularly, a groove 246 is formed in the base mount 184 in parallel to the guide rails 240 therebetween. The feed screw 244 extends within the groove 246 in the direction Z, and the nut 242 is projected from the bottom of the base mount 184 into the groove 246 so that the feed screw 244 can be threaded through the nut 242. On the other hand, a drive motor 248 for rotating the feed screw 244 is attached to a reduction gear box 250 which is fixedly mounted on a forward side wall of the base frame 180. One end portion of the feed screw 244 is supported by a bearing (not shown) provided in the reduction gear box 250 and is operatively connected to the drive motor 248 through the reduction gears (not shown) thereof, whereby the base mount 184 can be moved on the guide rails 240 in the direction Z by driving the drive motor 248 under the control of the NC unit 142'.

With the arrangement mentioned above, it can be easily understood that the NC machine according to the fourth embodiment can carry out the same working operation as the NC machine according to the third embodiment.

In the embodiments mentioned above, although the first carriages 42 and 200 are horizontally moved in the direction X1, they may be obliquely moved with respect to the horizontal, if necessary, with the direction X1 being perpendicular to the direction Z. On the other hand, although the second carriages 66 and 224 are vertically moved in the direction X2, they may be obliquely moved with respect to the vertical, if necessary, with the direction X2 being perpendicular to the direction Z.

Furthermore, when the machine is so arranged that working operation is carried out in the vicinity of the headstock, it is possible to eliminate use of the guide bush 38, 196 from the embodiments mentioned above.

In addition, in the first and second embodiments as well as the modifications thereof, the tool holders 118, 120 and 122 for the additional tools 124, 126 and 128 may be immovably mounted on the additional tool rest 116. In this case, of course, it is unnecessary to use the hydraulic actuator 132.

Although the preferred embodiments have been described using specific terms, this description is for illustrative purposes only, and it is to be understood that changes and variations may be made without departing from the spirit or scope of the following claims.

We claim:

1. A numerical control machine comprising:
   a machine bed;
   a headstock provided on the bed for rotatably supporting a spindle through which a workpiece can be passed;
   a base member provided on said bed in front of said headstock;
   a first tool rest means including a first carriage movable along a first guide path which is formed on said bed in the front of said headstock so as to extend below the longitudinal axis of said spindle and in a first direction perpendicular thereto, and two tool rests which are supported by said first carriage and which each hold at least one tool, said two tool rests being disposed on both sides of the longitudinal axis of said spindle opposing each other so that a selected one of the tools held by said two tool rests, respectively, is made accessible to the workpiece by moving said first carriage along said first guide path in the first direction;
   a second tool rest means including a second carriage movable along a second guide path which is formed on said base member provided on said bed between said first guide path and said headstock, so as to extend above the longitudinal axis of said spindle and in a second direction perpendicular thereto;
   a third carriage movable along a third guide path which is formed on said second carriage between said first guide path and said second guide pat so as to extend above the longitudinal axis of said spindle and in a third direction perpendicular thereto, and at least one third tool rest which is supported by said third carriage and which holds at least two tools, said third tool rest being so arranged that a selected one of the tools held by said third tool rest is made accessible to the workpiece by moving said second carriage along said second guide path in the second direction and by moving said third carriage along said third guide path in the third direction;
   said headstock and being movable in a fourth direction along the longitudinal axis of said spindle;
   a guide bush provided in said base member and having a longitudinal axis aligned with the longitudinal axis of said spindle for guiding the workpiece extending from said spindle;
   said first, second and third guide paths being disposed adjacent to said base member so that first, second and third, carriages, respectively, may be moved near to said guide bush;
   said first tool rest means being mounted on said first carriage and spaced from said guide bush and said first guide path being disposed at an angle so as to keep said first guide path free from cutting scraps produced from the workpiece during operation;
   a numerical control unit for controlling the movement of said first carriage in the first direction, the movement of said second carriage in the second direction, and the movement of said third carriage in the third direction, and the movement of said head stock in the fourth direction; and
   four drive motors which are individually driven under control of said numerical control unit so as to move said first carriage in said first direction, said second carriage in said second direction, said third carriage in said third direction and said headstock in said fourth direction, respectively, and wherein said numerical control unit has a simultaneous tri-axis interpolation function for simultaneously carrying out both a working operation in the first and fourth directions and a working operation in the third and fourth directions in a bi-axis interpolation mode through the intermediary of the axis of the fourth direction.

2. A numerical control machine as set forth in claim 1, wherein said numerical control unit further has a function corresponding to a bi-axis interpolation function for simultaneously driving the tool rest of said second tool rest means in both said second and third directions, whereby a selected one of the tools thereof is quickly moved to a predetermined position.

3. A numerical control machine as set forth in claim 1, wherein said first direction is perpendicular to said third direction, and is in parallel with said second direction.

4. A numerical control machine set forth in claim 1, wherein said first carriage is provided with an additional tool rest by which at least one additional tool such as a drill, tap or reamer is held to be opposed to said headstock.

5. A numerical control machine set forth in claim 4, wherein said additional tool is adapted to be projected from a retracted position to a working position in a direction along the longitudinal axis of said spindle.

6. A numerical control machine claim 4, wherein there are provided at least two additional tools, a selected one of which is movable by the movement of said first carriage in said first direction so that it is in accordance with the axis of the workpiece held by said spindle.

7. A numerical control machine set forth in claim 6, wherein all of said additional tools are adapted to be simultaneously projected from a retracted position to a working position in a direction along the longitudinal axis of said spindle.

* * * * *